US010635183B2

(12) United States Patent
Cobanoglu et al.

(10) Patent No.: US 10,635,183 B2
(45) Date of Patent: Apr. 28, 2020

(54) METHOD OF IDENTIFYING GESTURE EVENT TYPES ON A TEXTILE TOUCH PAD SENSOR

(71) Applicant: Sanko Tekstil Isletmeleri San. Ve Tic. A.S., Inegol-Bursa (TR)

(72) Inventors: Ozgur Cobanoglu, Inegol-Bursa (TR); Fehim Caglar, Inegol-Bursa (TR); Semih Kazanc, Inegol-Bursa (TR); Jitka Eryilmaz, Inegol-Bursa (TR); Serkan Mert, Inegol-Bursa (TR); Ertug Erkus, Inegol-Bursa (TR); Lian Kohener, Inegol-Bursa (TR)

(73) Assignee: Sanko Tekstil Isletmeleri San. Ve Tic. A.S., Inegol-Bursa (TR)

( * ) Notice: Subject to any disclaimer, the term of this patent is extended or adjusted under 35 U.S.C. 154(b) by 0 days.

(21) Appl. No.: 16/168,914

(22) Filed: Oct. 24, 2018

(65) Prior Publication Data
US 2019/0129509 A1   May 2, 2019

(30) Foreign Application Priority Data

Oct. 31, 2017 (EP) .................................. 17199442

(51) Int. Cl.
*G06F 3/01* (2006.01)
*G06F 3/044* (2006.01)
(Continued)

(52) U.S. Cl.
CPC .............. *G06F 3/017* (2013.01); *G06F 1/163* (2013.01); *G06F 3/03547* (2013.01);
(Continued)

(58) Field of Classification Search
CPC .... G06F 3/017; G06F 3/03547; G06F 3/0418; G06F 3/044; G06F 3/04883; G06F 1/163; G06F 2203/04102
See application file for complete search history.

(56) References Cited

U.S. PATENT DOCUMENTS 6,210,771 B1 *    4/2001  Post ........................ H05K 3/10
                                                          428/100
2011/0035700 A1   2/2011  Meaney et al.
(Continued)

FOREIGN PATENT DOCUMENTS

WO         2016025554         2/2016

OTHER PUBLICATIONS

European Search Report dated May 4, 2018 for EP priority application No. 17199442.9.
(Continued)

*Primary Examiner* — Lisa S Landis
(74) *Attorney, Agent, or Firm* — Silvia Salvadori

(57) ABSTRACT

A method of identifying gesture event types on a textile touch pad sensor (10) with the steps of:
  memorizing raw touch data generated by the conductive grid (17) during a predefined interval of time in which a gesture event is performed on the pad sensor;
  estimating the type of a gesture event performed on the pad sensor by analyzing the raw touch data generated by the conductive grid;
  measuring the total time (eventLength) of the gesture event performed on the pad sensor;
  memorizing the longest time (longestX, longestY) during which a conductive yarn of the conductive grid has been touched during the gesture event;
  correcting the estimation of the gesture type, if the longest time during which a conductive yarn of the conductive
(Continued)

grid has been touched is greater than a quantity that is a function of the total time of the gesture event.

9 Claims, 5 Drawing Sheets

(51) Int. Cl.
  *G06F 3/0354* (2013.01)
  *G06F 3/0488* (2013.01)
  *G06F 3/041* (2006.01)
  *G06F 1/16* (2006.01)
(52) U.S. Cl.
  CPC ............ *G06F 3/044* (2013.01); *G06F 3/0418* (2013.01); *G06F 3/04883* (2013.01); *G06F 2203/04102* (2013.01)

(56) References Cited

U.S. PATENT DOCUMENTS

| | | | |
|---|---|---|---|
| 2011/0043456 A1 | 2/2011 | Rubinstein | |
| 2015/0199045 A1 | 7/2015 | Robucci | |
| 2016/0284436 A1* | 9/2016 | Fukuhara | ............ D03D 1/0088 |

OTHER PUBLICATIONS

International Search Report dated Dec. 12, 2018 for corresponding International application No. PCT/EP2018/079687.

* cited by examiner

METHOD OF IDENTIFYING GESTURE EVENT TYPES ON A TEXTILE TOUCH PAD SENSOR

This non-provisional application claims priority to and the benefit of European Application No. 17199442.9 filed on Oct. 31, 2017, the content of which is incorporated herein by reference in its entirety.

The present invention relates to a method of identifying gesture event types performed on a textile touch pad sensor.

As it is known, conventional touch pads are generally solid devices with no folding, bending or wrinkling properties. Accordingly, touch events and gesture events performed on conventional touch pads are clean and generally free from geometrical ambiguities.

A new frontier in interactive devices is made by textile touch pads or, generally speaking, interactive textiles comprising one or more the textile touch pad sensors.

Textile touch pad sensors are usually stretchable, generally flexible and foldable and may also be used as wearable textile touch pads or may be easily integrated within flexible objects, such as clothing, handbags, fabric casings, hats, and other textile goods.

Interactive textiles can be used in a variety of applications, such as position sensitive control strips to control external devices, such for example the volume of an MP3 player or as touch pads to write text messages or for other applications.

A problem that arises with textile touch pad sensors or pads is connected a fabric form factor typical of such devices, namely in contrast with conventional solid touch pads, textile touch pad sensors are generally flexible, usually stretchable and generally bendable.

As a consequence, prior art gesture types and corresponding algorithms to interpret the data are generally not optimal. Therefore, neither the produced data have features specific to soft materials, nor the algorithms to interpret such data have code blocks to handle optimally the features associated to flexible, stretchable and bendable textile fabric structures.

Document WO2016025554 discloses an interactive textile including non-conductive threads woven with conductive threads. Each conductive thread is woven into an interactive textile to form a grid that includes a set of substantially parallel conductive threads and a second set of substantially parallel conductive threads that crosses the first set of conductive threads to form the grid.

The interactive textile device is associated with a gesture manager that determines gestures performed by a user based on the touch data, which can then be used to control objects, computing devices, or applications running on computing devices.

The gesture manager is configured to interpret touch-inputs such as a single-finger touch, a double-tap, a two-finger touch and a swipe by performing suitable algorithms on the data generated by such events, the algorithms described in such being similar to those applied to conventional touch pads.

For example a swipe up gesture is detected by detecting, in succession, coordinates X1,Y1 (at time T0), X1,Y2 (at time T1) and X1,Y3 (at time T2), as in a conventional touch pad. In this particular example, the algorithm recognizes a swipe up gesture by recognizing that the horizontal coordinate X does not vary and that the vertical coordinate Y increases over time.

Document U.S. Pat. No. 6,210,771D2 describes electronic devices and their integration into textiles that are flexible, accommodate stress and movement without damage, and can be laundered. The touch-sensitive fabric composite includes a first panel comprising stripes of conductive material and a second fabric panel comprising stripes of resistive material. When the stripes of the panels comes into contact, the location of the contact is provided to a control logic circuit, which takes appropriate action based thereon.

Document US2015199045 describes a proximity-based motion detection system which includes a capacitive sensor array (CSA) assembly and a controller. The capacitor plates are preferably made from conductive textile that can be integrated into other textiles, such as clothing, bed linens, etc., or that can be integrated into the environment (e.g., furniture, wheelchairs, car seats, etc.). Such document also describes a hierarchical signal processing method with reference to two categories of gestures: swipes and hovers, also providing characteristic responses.

Generally speaking, gesture types that comprise diagonal swipes may be detected by memorizing raw touch data generated by the textile touch pad sensor during a predefined interval of time and by analyzing the memorized raw touch data of the gesture by a suitable algorithm that detects the change over time of the X and Y coordinates that are touched successively on the textile touch pad.

However, a problem arises in textile sensors in case of strictly vertical or strictly horizontal gestures due to the form factor of the textile substrate itself that may generate imperfect acquisitions.

For example, in a swipe from top to bottom gesture, that may be used for example to control the volume of a speaker, only the Y coordinate should vary, and the X coordinate should remain constant, but it may happen that also variations of the X coordinate are detected.

It is an aim of the present invention to provide a method of identifying gesture event types on a textile touch pad sensor, the textile touch pad sensor comprising a plurality of non-conductive yarns interwoven with conductive yarns forming a conductive grid, the method comprising the steps of:

memorize raw touch data generated by the conductive grid during a predefined interval of time in which a gesture event is performed on the textile touch pad sensor;

estimating the type of a gesture event performed on the textile touch pad sensor by analyzing the raw touch data generated by the conductive grid;

measuring the total time length of the gesture event performed on the textile touch pad sensor;

memorizing the longest time during which a conductive yarn of the conductive grid has been touched during the gesture event;

correcting the estimation of the gesture type, if the longest time during which a conductive yarn of the conductive grid has been touched is greater than a quantity that is a function of the total time length of the gesture event.

An advantage of this embodiment is that the proposed method compares the total time length of the event with the time length of firing of individual stripes in order to determine if a certain gesture is intentional or not in analogy to a human evaluation procedure of the same situation.

At the same time the cognitive content of the gesture, namely the meaning the users attach to a specific gesture performed on the textile substrate, is kept distinct from the technical content of the gesture, and in particular from the data structure generated by the gesture.

Preferred embodiments are the object of dependent claims.

The invention will now be described in greater detail, by way of example, with reference to the accompanying non limiting drawings, wherein like numerals denote like elements, and in which.

Exemplary embodiments will now be described with reference to the enclosed drawings without intent to limit application and uses.

Figure 1:
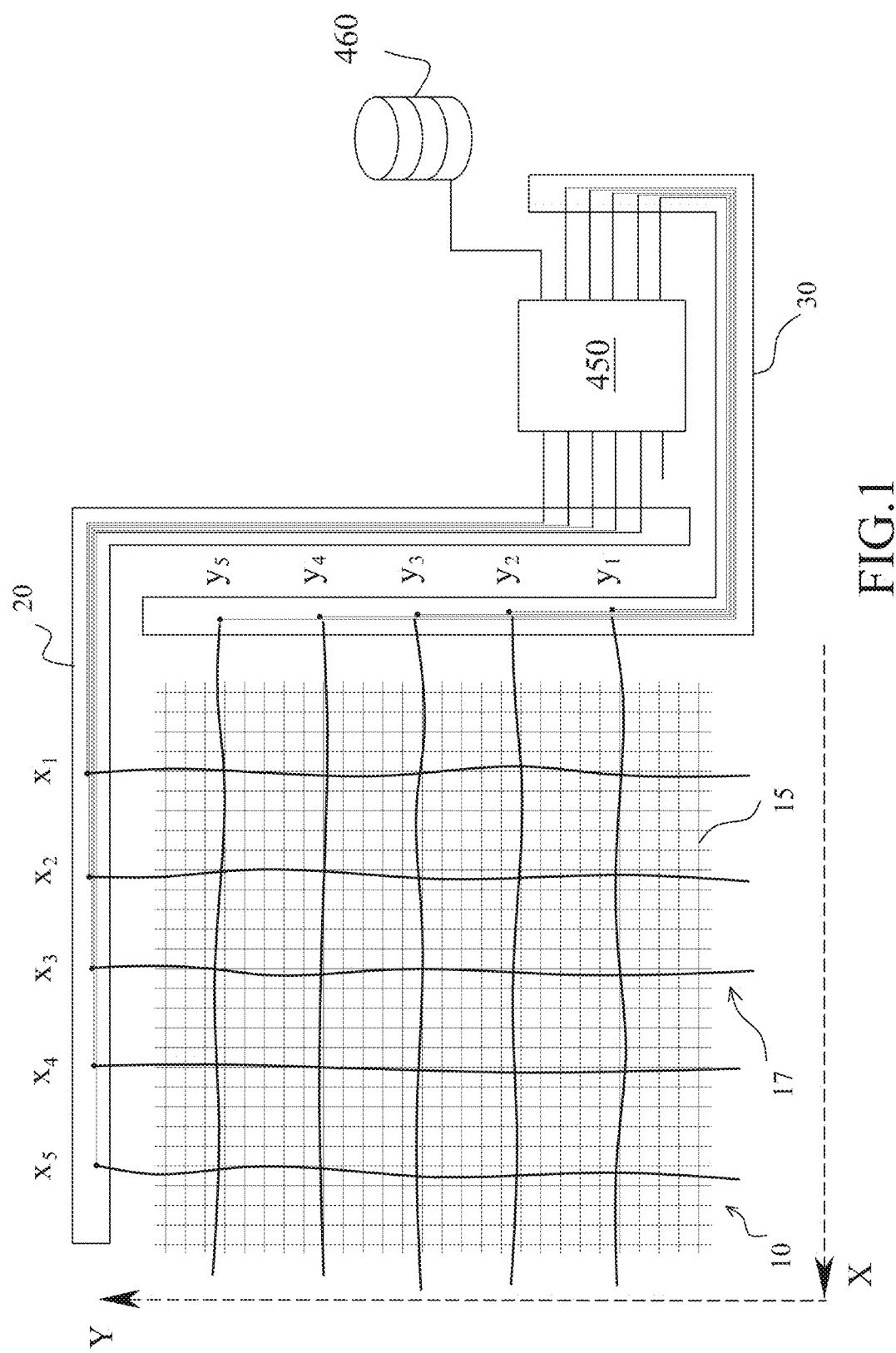
FIG. 1 shows an example of a textile touch pad sensor connected to an electronic control unit configured to interpret human gestures performed on the textile touch pad.

In FIG. 1 a textile touch pad sensor, globally indicated with the numerical reference 10, is represented.

The textile touch pad sensor 10 comprises a textile substrate 15 of non-conductive yarns in which conductive yarns are woven.

In particular, a first set of conductive yarns X1-X5 are woven in the non-conductive textile grid 15 and are arranged substantially along a first direction indicated with Y, while a second set of conductive yarns Y1-Y5 are woven in the non-conductive textile grid 15 and are arranged substantially along a second direction indicated with X, the first and second direction being mutually perpendicular.

In this way, the first and second set of conductive yarns form a conductive textile grid 17 and points P (Xi,Yi) on the conductive textile grid 17 can be identified by the crossing of the corresponding conductive yarns Xi and Yi.

In FIG. 1, a 5×5 conductive textile grid 17 is represented for the sake of example, being it clear that the present invention can be applied to conductive textile grids having a different number of conductive yarns.

The conductive textile grid 17 is electrically connected to an Electronic Control Unit (ECU) 450, the ECU 450 being also provided with a memory unit 460 and configured to receive and interpret a data structure generated by a human gesture performed on the textile touch pad sensor 10, as will be better explained hereinafter.

In particular, the first set of conductive yarns X1-X5 is electrically connected to the ECU 450 by means of bus 20 and the second set of conductive yarns Y1-Y5 is electrically connected to the ECU 450 by means of bus 30. In the example above therefore a ten-channel textile touch screen sensor is described, summing up the five conductive yarns X1-X5 and the five conductive yarns Y1-Y5.

In the textile touch pad sensor 10, touch events generate binary data that are read-out by the ECU 450, for example an Atmel microcontroller at full speed.

The data are first analyzed in order to understand the read-out speed of the system as a whole.

In an embodiment of the invention, adjacent sensor stripes are read-out with a delay of 8 μs and a full touch-fabric read-out takes about 22 ms which corresponds to a read-out speed of roughly 46 Hz, meaning that the textile touch pad sensor 10 gets fully read-out 46 times every second. The relatively long duration of 22 ms, compared to 8 μs stripe read-out, is mainly due to the load created by the execution of the method.

The method opens an event window, equivalent to 30 line readings or frames, denoted by the variable "window", whenever a stripe fires. This gesture event, which is 30 frame long, is stored temporarily in an array denoted by event[ ][ ], namely memorizing raw binary touch data generated by the conductive grid 17 during a predefined interval of time in which a gesture event is performed on the textile touch pad sensor 10 in an array.

Of the number of 30 line readings or frames is an exemplary (and not limitative) number.

Such number depends on the read-out speed of the whole sensor pad. It corresponds to "time" during which a gesture is expected to be completed and it is programmable.

In this specific example 30 is the number only for this specific example and prototype where the read-out speed is 46 Hz. In case of different read-out speed, the event window could vary without departing from the present invention.

The array event[ ][ ] is then analyzed and a decision is taken using an algorithm that is extremely sensitive for diagonal swipe events and its interpretation efficiency is always close to 100%. Single tap gesture recognition efficiency is the same and is very close to 100% efficiency.

In this case, the method according to the invention provides to read out the gesture performed by polling the textile touch pad sensor 10 several times every second and populates an array with the event array event [ ][ ].

Figure 2:
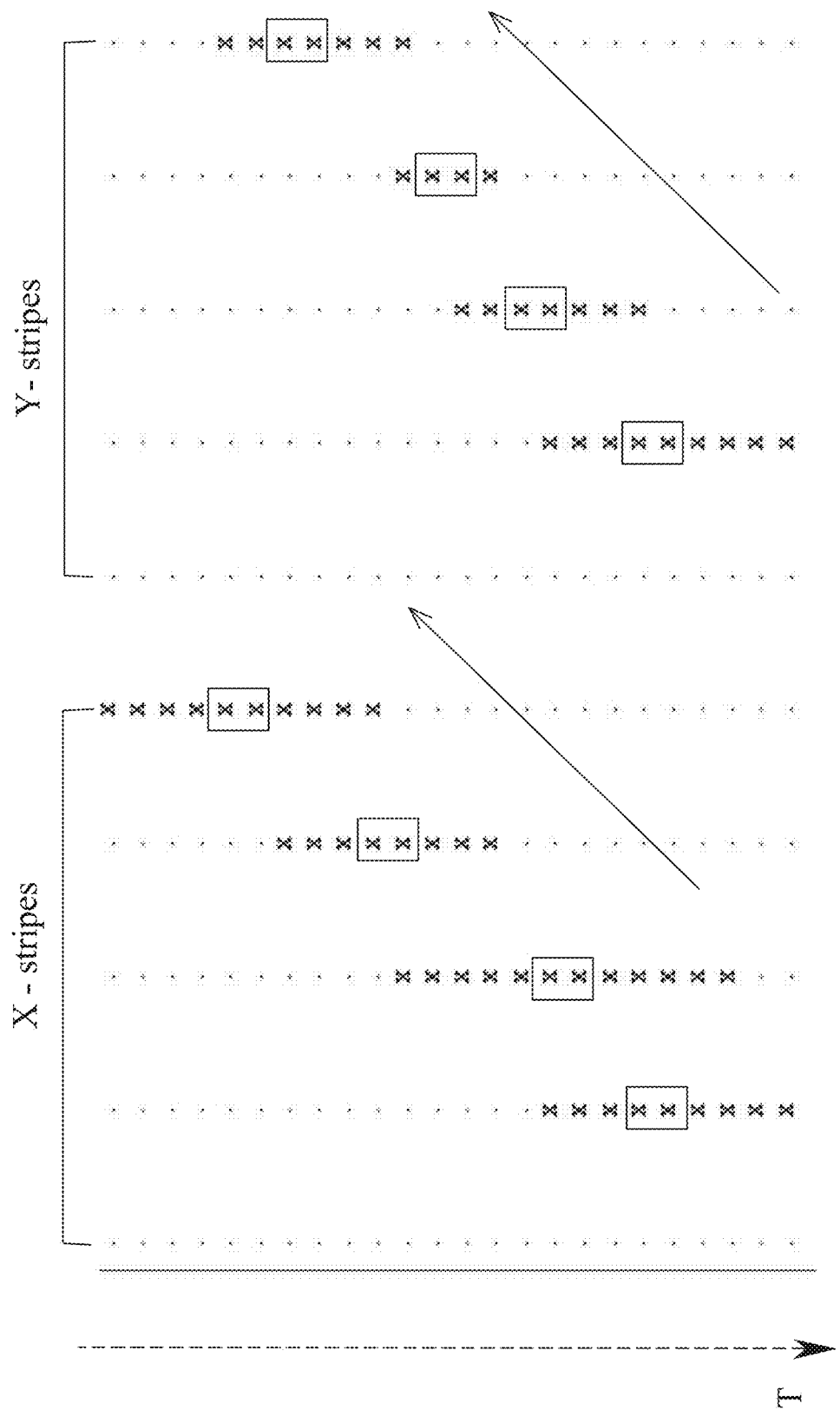
FIG. 2 shows a first example of a gesture performed on the textile touch pad of FIG. 1.

In the case of the 5×5 conductive textile grid represented in FIG. 1, the array event has ten columns, five for the X yarns and five for the Y yarns. For each column of the array, "." (a dot) symbol is plotted if the corresponding yarn is not fired and a "x" (a cross) symbol in plotted if the corresponding yarn is fired along the time window dedicated to the particular gesture event as depicted in the example of FIG. 2.

In the method, data are analyzed and a decision upon the gesture type is performed using, for example, variables such as sumX and sumY, that are calculated on the basis of the row and columns of the textile touch pad sensor 10 that are interested by a gesture by the user or not, for example in a gesture in which a finger of a user passes from a column to another column and so on.

The calculated values of the sumX and sumY are correlated to a decision matrix in order to decide what type of gesture has been made on the basis of the collected data:

A proposed matrix is the following:

if (sumX>0 && sumY>0) decision="diagonal bottom right to top left";

if (sumX<0 && sumY<0) decision="diagonal top left to bottom right";

if (sumX>0 && sumY<0) decision="diagonal top right to bottom left";

if (sumX<0 && sumY>0) decision="diagonal bottom left to top right";

if (sumX==0 && sumY>0) decision="bottom to top";

if (sumX==0 && sumY<0) decision="top to bottom";

if (sumX>0 && sumY==0) decision="right to left";

if (sumX<0 && sumY==0) decision="left to right";

if (sumX==0 && sumY==0)decision="tap-only".

The above described algorithm is particularly useful in determining diagonal events such as diagonal bottom left to top right events such as the one depicted in FIG. 2.

Nevertheless, the method is particularly sensitive to imperfect acquisitions when the gesture has straight vertical or straight horizontal components such as "swipe from top to bottom" gestures in which the column is the same but the row changes as the stimulus moves from top to bottom.

For example, it may happen that a user wishes to perform a "swipe down" gesture from top to bottom in a vertical direction. In this case only the Y value representing high would change and the X value would remain constant.

Nevertheless, the user due to the textile deformation of the sensor may generate also "imperfect" signals that, in this particular example, involve also X coordinates adjacent to the X coordinate that should not be involved.

Figure 3:
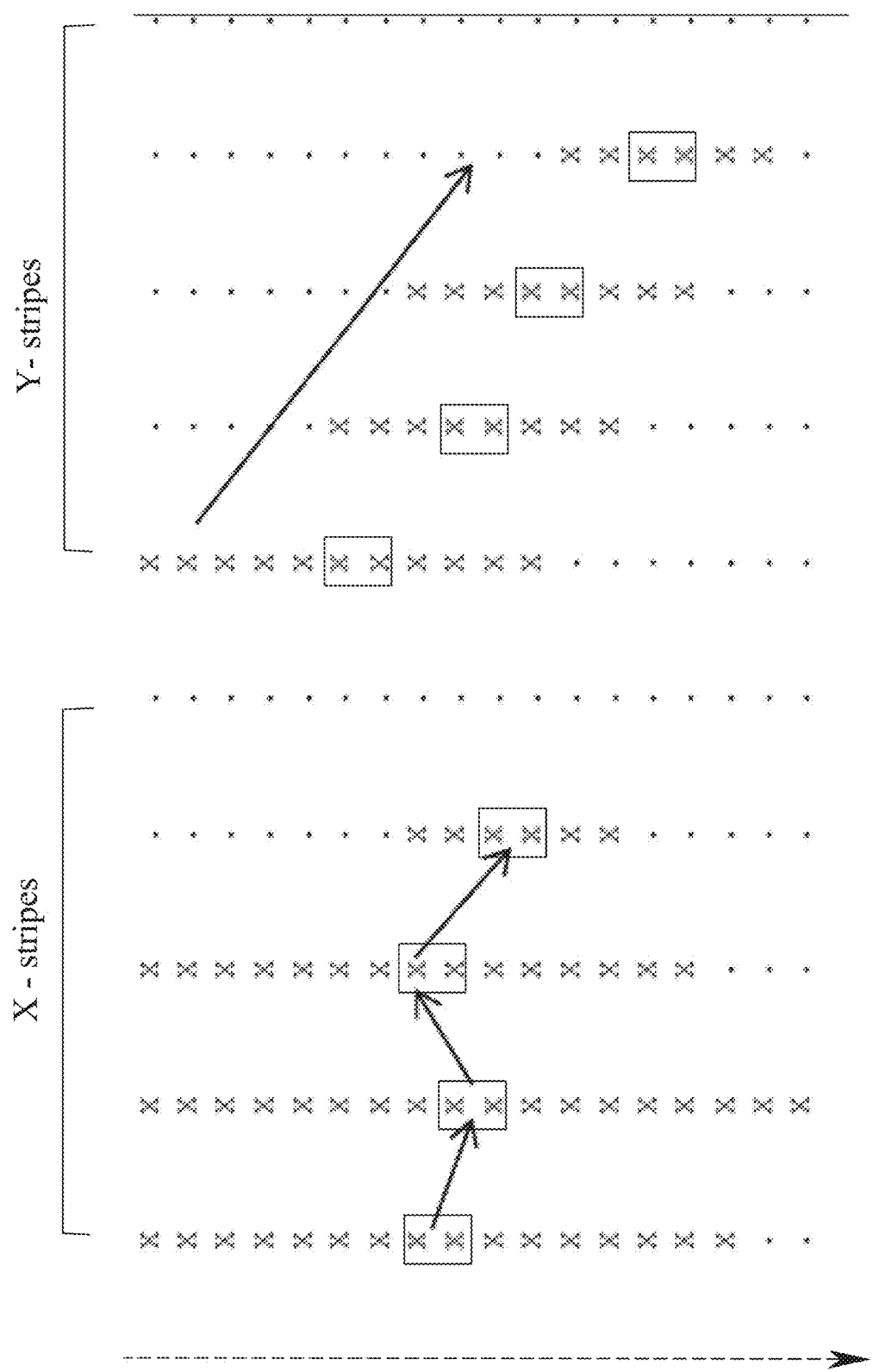
FIG. 3 show a further example of a gesture performed on the textile touch pad of FIG. 1.

For example in the case depicted in FIG. 3, the ECU 450 could interpret the signals of the X stripes as going down, then up, then down again and concluding that the user had the intention to perform a down gesture on the X axis, while at the same time the ECU 450 would interpret the signals of the Y stripes as going down, concluding wrongly that a diagonal event was intended.

Human eye instead would correctly interpret that the user did intend a gesture having a constant X coordinate and would conclude correctly that a top to bottom swipe was intended.

The proposed the method, to correct the above problem, introduces a variable eventLength whose value is calculated by calculating the total event length of a gesture, within the listening window of 30 in this example.

Further variables are named longestX and longestY which represent respectively the longest time during the selected gesture in which a certain "stripe" has been touched.

The following criteria are then calculated:

$$longestX > 3.0 * eventLength/4 \text{ (for coordinate } X\text{)}$$

and $$longestY > 3.0 * eventLength/4 \text{ (for coordinate } Y\text{)}$$

which, if verified either for the X or for the Y coordinate, is representative of the fact that the user intended to maintain constant the relative direction of the gesture.

In general, the criteria could be written as:

$$longestX > k_1 * eventLength/k_2 \text{ (for coordinate } X\text{)}$$

and $$longestY >> k_1 * eventLength/k_2 \text{ (for coordinate } Y\text{)}$$

where the values of $k_1$ and of $k_2$ may vary according to different design choices, the above value respectively of $k_1=3$ and $k_2=4$ having being chosen as preferred but not limitative examples.

These values have been determined by a calibration procedure after a suitable experimental activity and the above criteria are inspired by what a human evaluation on data or human eye visually would conclude in the same situation.

Figure 4:
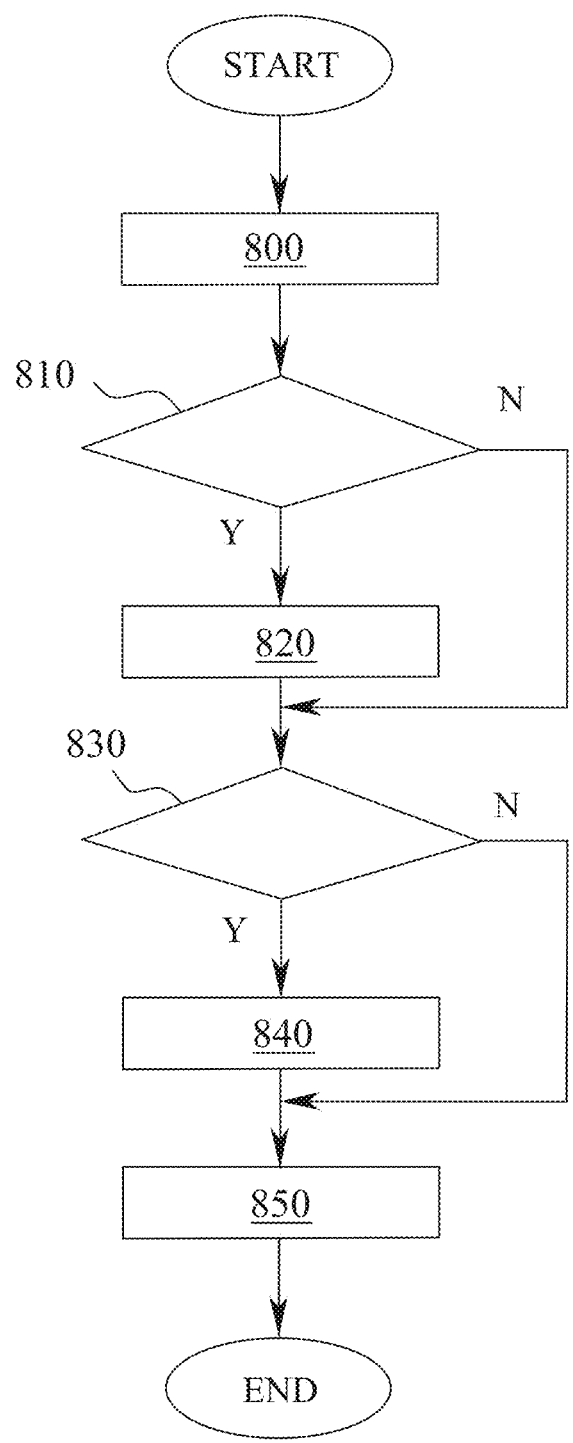
FIG. 4 shows a flowchart describing an embodiment of the method of the invention.

FIG. 4 shows a flowchart describing an embodiment of the method of the invention.

At the start of the method, raw touch data generated by the conductive grid 17 during a predefined interval of time in which a gesture event is performed on the textile touch pad sensor are memorized in an array (block 800).

Upon the very first touch instance, a window for listening N number of frames opens and records all the N frames and then the window closes, recording nothing.

A copy of the frame is created and all sparse frames and/or columns are removed, shifting frames and/or columns containing data upwards and/or left within the two dimensional array, respectively. In other words, the frame—as a two dimensional array—gets defragmented for further processing. Averages per individual sensors and min/max durations are recorded. This is the information basically that compensates for the imperfect acquisitions.

A first check is made to verify if, for coordinate X, the condition $longestX > k_1 * eventLength/k_2$ is verified (block 810).

In the affirmative, the method determines that a gesture having a constant X coordinate was intended (820).

Then a second check is made to verify if, for coordinate Y, the condition $longestY > k_1 * eventLength/k_2$ is verified (block 830).

In the affirmative, the method determines that a gesture having a constant Y coordinate was intended (840).

Finally the method interprets the gesture performed as having a constant X coordinate or a constant Y coordinate on the basis of the checks performed above (block 850).

If both checks have a positive outcome, the gesture may be interpreted as a single touch gesture.

If both checks have a negative outcome, the gesture may be interpreted has a diagonal gesture.

Figures 5, 6, 7:
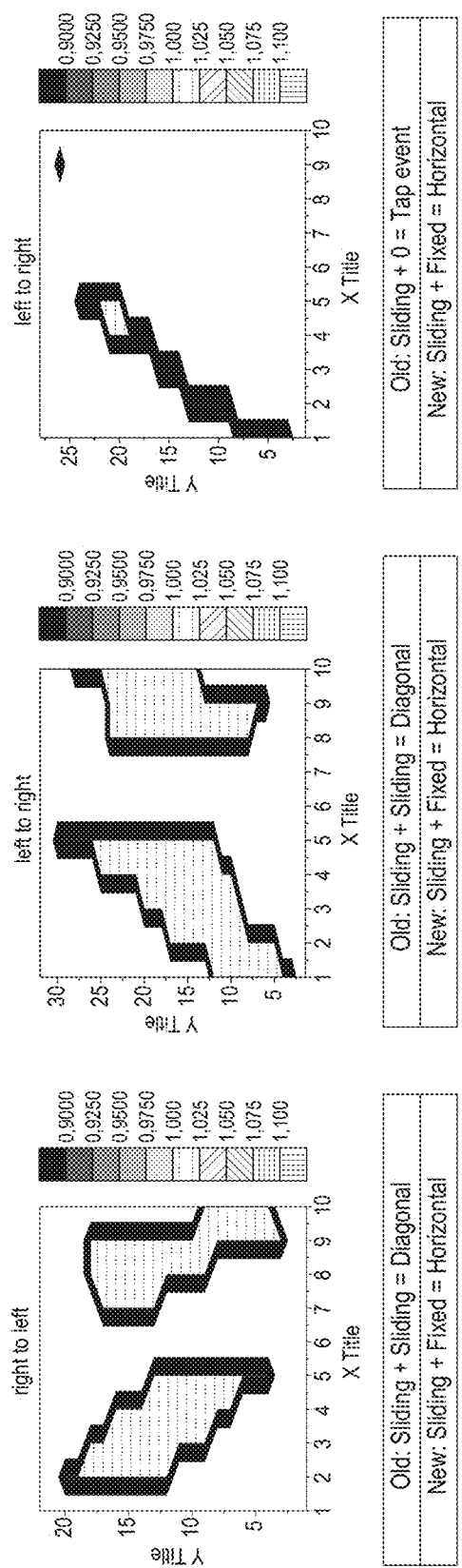
FIGS. 5 to 7 represent example plots of the evaluator of the present algorithm.

FIGS. 5 to 7 represent example plots of the evaluator of the present algorithm in case of imperfect acquisitions.

A prior art algorithm, without the above described addition, would conclude that the event in FIG. 5 would be a diagonal swipe as the average of both X and Y data show a sliding pattern.

However, employing the present algorithm, ensures correct judgement.

Similarly, events in FIG. 6 and FIG. 7 are both correctly interpreted as swipe gestures from left to right in a horizontal direction; however, they would be interpreted by algorithms of the prior art as a diagonal and a single tap event, respectively, It has been demonstrated that the method above described correctly evaluates horizontal, vertical, and diagonal events as well as single taps correctly with high efficiency.

Another possibility is that these gestures can be interpreted by a remote device receiving the data. In case electronics fail making a decision, then the remote receiving device should evaluate the raw data to apply more complex algorithms for interpretation.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

The invention claimed is:

1. A method of identifying gesture event types on a textile touch pad sensor, the textile touch pad sensor comprising a plurality of non-conductive yarns interwoven with conductive yarns forming a conductive grid, the method comprising the steps of:

memorizing raw touch data generated by the conductive grid during a predefined interval of time in which a gesture event is performed on the textile touch pad sensor;

estimating the type of a gesture event performed on the textile touch pad sensor by analyzing the raw touch data generated by the conductive grid;

measuring the total time of the gesture event performed on the textile touch pad sensor;

memorizing the longest time during which a conductive yarn of the conductive grid has been touched during the gesture event;

correcting the estimation of the gesture type, if the longest time during which a conductive yarn of the conductive grid has been touched is greater than a quantity that is a function of the total time of the gesture event.

2. The method according to claim 1, wherein the estimated gesture type is corrected into a gesture type having a horizontal direction component if a predetermined condition is met.

3. The method according to claim 2, wherein the predetermined condition to correct the estimated gesture type into a gesture type having a horizontal direction component is expressed by the equation:

$$longestX > k1 * eventLength/k2$$

where longestX is the longest time during which an horizontal conductive yarn of the conductive grid has been touched, eventLength is the total time of the gesture, and k1 and k2 are constant parameters.

4. The method according to claim 1, wherein the estimated gesture type is corrected into a gesture type having a vertical direction component if a predetermined condition is met.

5. The method according to claim 2, wherein the predetermined condition to correct the estimated gesture type into a gesture type having a vertical direction component is expressed by the equation:

$$longestY > k1 * eventLength/k2$$

where longestY is the longest time during which a vertical conductive yarn of the conductive grid has been touched, eventLength is the total time of the gesture, and k1 and k2 are constant parameters.

6. The method according to claim 3, wherein the estimated gesture type is corrected into a single tap gesture type if the following predetermined conditions $$longestX > k1 * eventLength/k2$$

and $$longestY > k1 * eventLength/k2$$

are concurrently met.

7. The method according to claim 3, wherein the values of k1 and k2 are determined by a calibration procedure.

8. A textile substrate for interpreting human gestures, the textile substrate comprising a textile touch pad sensor comprising a plurality of non-conductive yarns interwoven with conductive yarns forming a conductive grid, the conductive grid being connected to an electronic control unit configured to receive and interpret a data structure generated by a human gesture according to the method of claim 1.

9. A computer-implemented data structure codifying a gesture performed on a textile substrate, the textile substrate comprising a textile touch pad sensor, the data structure comprising raw touch data generated by the conductive grid during a predefined interval of time in which a gesture event is performed on the textile touch pad sensor, the data structure being suitable to be interpreted by an electronic control unit according to the method of claim 1.

* * * * *